Figure 1:
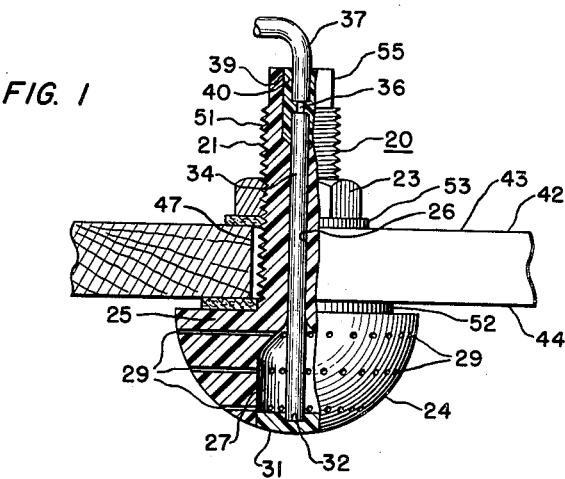

April 4, 1961

R. C. SABINS 2,978,400

REFERENCE HALF CELL ASSEMBLY

Filed Dec. 3, 1956

INVENTOR.
ROLLAND C. SABINS

BY Fulwider, Mattingly
and Huntley
ATTORNEYS

United States Patent Office 2,978,400
Patented Apr. 4, 1961

2,978,400
REFERENCE HALF CELL ASSEMBLY

Rolland C. Sabins, San Diego, Calif., assignor, by direct and mesne assignments, to Sabins Dohrmann, Inc., San Francisco, Calif., a corporation of California Filed Dec. 3, 1956, Ser. No. 625,708

1 Claim. (Cl. 204—195)

The present invention relates to an electrode assembly including an electrode, an insulator therefor, and mechanism for attaching the same to an element such as the hull of a ship. More particularly, the electrode is a reference half-cell used in an electrolytic corrosion-preventing system.

The electrode assembly of the present invention comprises a hollow stem formed of suitable insulating material such "Lucite." An elongated electrode is disposed within and extends longitudinally of the stem. An electrical inductor is connected to one end, which is herein referred to as the inner end, of the electrode. The same end of the stem is sealed to prevent water passing longitudinally through the stem. The other end, or outer end of the stem, is disposed in the electrolyte and is provided with a plurality of orifices so that the electrode is subjected to electrolyte.

In one embodiment of the invention, the stem is in the form of the shank of a bolt, the bolt also having a head. The shank or stem is exteriorly threaded, which, in co-operation with a nut and the head, provides for attaching the stem to the hull of a ship.

Further advantages will be apparent from the following description, reference being had to the accompanying drawing wherein a perferred embodiment of the invention is illustrated.

In the drawing:

Fig. 1 is a side view, partly in section, showing one form of my invention as applied to a wooden hull of a ship.

Referring more particularly to the drawing, the electrode assembly 20 includes an elongated hollow stem 21 formed of suitable insulating material, such as "Lucite." The stem is threaded for receiving a nut 23. A head 24 is formed integrally wth the stem; the stem and head form an insulator 25. The hole in the stem 21 is indicated at 26. This hole is enlarged, as at 27, in the head 24. A series of orifices 29 is formed in the head 24. These orifices are disposed transversely of the hole 26 and enlargement 27. The outer or lower end of the enlarged hole 27 is closed by a plug 31 having a recess 32.

An electrode 34, in the form of a cylindrical elongated piece of silver-silver chloride, is disposed within the hole 26, the outer end thereof extending through the enlarged opening 27 and resting in the recess 32 of plug 31. The inner or upper end of the electrode is welded or soldered to an electrical conductor 36, said conductor being covered by insulation 37. The outer end of the stem is provided with an enlarged opening 39. A casting material 40 is disposed in this opening 39 and surrounds the outer end of electrode 34 and the wire 36 to hermetically seal the outer end of the stem 21.

The electrode is particularly useful as a reference half-cell such as that employed in my United States Letters Patent No. 2,918,420, issued December 22, 1959, for Electrolytic System. Such system is particularly useful for preventing corrosion, for example of steel in ships.

The electrode or reference half-cell is subjected to the water in which the ship floats and is electrically connected with desirable control mechanism. The device shown is illustrated in connection with the wooden hull 42 of a ship. The interior side of the hull is indicated at 43 and the exterior at 44. The head 24 of the insulator 25 is exposed to the water and so likewise is the outer end of the electrode 34 through the orifices 29.

The stem 21 of the insulator 25 extends upwardly through a circular opening 47 in the hull 42. The stem is threaded as at 51 for receiving the nut 23 by which the assembly 20 is attached to the hull, there being a waterproof packing 52 between the head 24 and the bottom of the hull, and a gasket 53 between the bottom of nut 24 and the interior surface 43 of the hull.

The reference half-cell and insulator therefor can be readily attached to or removed from the hull by merely manipulating the nut 23. If desirable, flats 55 can be provided at the outer end of stem 21 for a wrench for preventing turning of the stem while the nut is being manipulated.

While the form of embodiment herein shown and described constitutes a preferred form, it is to be understood that other forms may be adopted falling within the scope of the claim that follows.

I claim:

In combination with a ship hull; an insulator including a stem extending through an opening in the hull of the ship, said insulator having a head exterior of the hull, said head having a shoulder abutting the exterior side of the ship, said stem being exteriorly threaded, said stem being hollow and having a recess in the inner end thereof; a reference half cell within the hollow of the stem and extending longitudinally thereof, one end of the half cell extending into the recess; a conductor connected with an end of the half cell within the recess; casting material within the recess and embedding the end of the conductor where the latter is connected with the half cell and for sealing said end of the stem, the other end of the stem having a plurality of orifices; and a nut within the hull and on the threaded stem for clamping the shoulder of the head against the hull.

References Cited in the file of this patent

UNITED STATES PATENTS

| | | |
|---|---|---|
| 1,373,951 | Cox et al. | Apr. 5, 1921 |
| 1,467,890 | Wilkie et al. | Sept. 11, 1923 |
| 2,215,213 | Ellis | Sept. 17, 1940 |
| 2,672,441 | White | Mar. 16, 1954 |
| 2,697,070 | Arthur | Dec. 14, 1954 |
| 2,733,201 | Thompson | Jan. 31, 1956 |
| 2,769,072 | Obenshain | Oct. 30, 1956 |

FOREIGN PATENTS

| | | |
|---|---|---|
| 644,651 | Germany | May 10, 1937 |